Jan. 4, 1955   J. R. KEACH   2,698,458
APPARATUS FOR MANUFACTURE OF VULCANIZED PRODUCTS
Filed Aug. 9, 1951
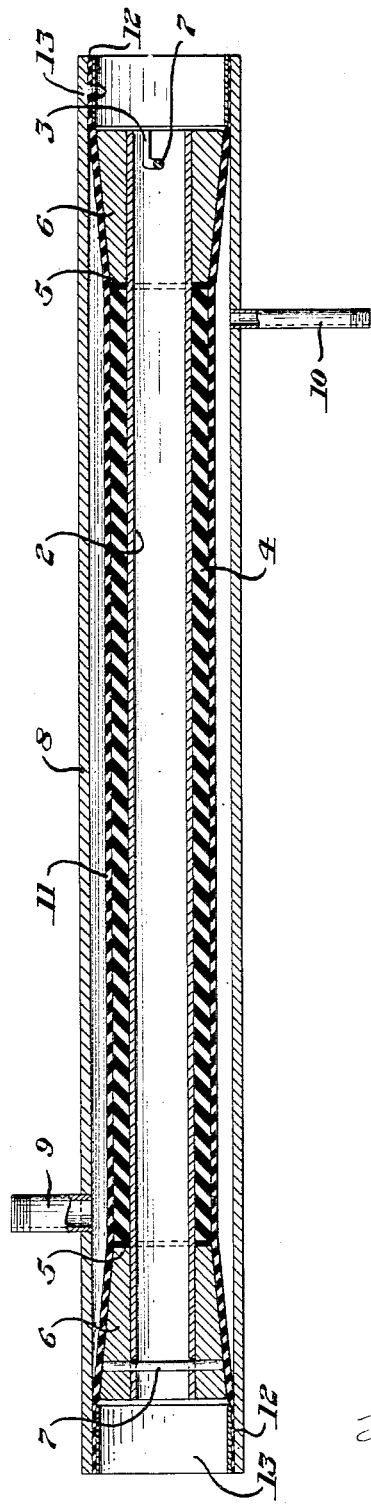
INVENTOR
JAMES ROBERT KEACH

United States Patent Office 2,698,458
Patented Jan. 4, 1955

2,698,458

APPARATUS FOR MANUFACTURE OF VULCANIZED PRODUCTS

James Robert Keach, Melrose Park, Pa., assignor to Quaker Rubber Corporation, Philadelphia, Pa., a corporation of Pennsylvania Application August 9, 1951, Serial No. 241,115

3 Claims. (Cl. 18—6)

This invention relates to the manufacture of vulcanized products. It relates to an improved method of and improved apparatus for vulcanizing a blank of material having a vulcanizable component.

While my invention is of broad application it has utility in the vulcanizing of hose made of material having a vulcanizable component and for purposes of explanation and illustration the invention will be described in connection with the vulcanizing of reinforced rubber air brake hose. The invention greatly facilitates vulcanizing of such hose and enables the production of a superior product at materially reduced cost.

Prior to my invention it was customary to make reinforced rubber air brake hose as follows. First, a tube of unvulcanized rubber was formed, generally by extrusion. A mandrel was inserted into the tube. Reinforcing and an outer sheet rubber cover were then wrapped around the inner tube with the mandrel therein. Thus there was formed on the mandrel a blank comprising inner and outer unvulcanized rubber tubes with reinforcing therebetween. The ends of the blank were trimmed while on the mandrel, cured rubber backing washers were applied over the ends of the mandrel and against the ends of the blank and retainers were applied over the mandrel and against the washers to maintain the washers tightly against the trimmed ends of the blank. The thus prepared blank disposed about the mandrel was then wrapped in cloth and introduced along with similar prepared and wrapped blanks disposed about mandrels into a steam chamber wherein the blank was vulcanized. Thereafter the blank disposed about the mandrel was removed from the steam chamber, the cloth covering unwrapped therefrom and the washers and retainers removed from the mandrel and the vulcanized blank, then finished air brake hose, was stripped from the mandrel.

It was customary to use two wrapping machines, one for wrapping the reinforcing and the outer rubber cover on the inner unvulcanized rubber tube disposed about the mandrel and the other for wrapping in cloth the thus prepared blank disposed about the mandrel to prepare it for vulcanizing. It was customary to unwrap the cloth from a vulcanized blank disposed about a mandrel simultaneously with wrapping the same cloth about an unvulcanized blank disposed about another mandrel. The wrapping and unwrapping of the blanks with cloth and the handling of the blanks with mandrels therein into and out of the steam chamber consumed much time and labor and the results were not uniform. Great care had to be taken to avoid wrinkles in the wrapping cloth and despite such care the surface of the vulcanized hose was not uniformly smooth but contained imprints of cloth wrinkles or of the inner end edge of the wrapping cloth. Care also had to be taken to apply the wrapping cloth with uniform pressure along the blank as otherwise the blank would not be of desired uniformity.

I provide for manufacturing vulcanized products with the elimination of all of the disadvantages above mentioned. By way of example, I produce a superior unprecedentedly uniform vulcanized reinforced rubber air brake hose at substantially reduced cost. I do away entirely with wrapping and unwrapping of the blanks with cloth before and after vulcanizing, thus freeing the second wrapping machine for wrapping the reinforcing and the outer sheet rubber covers about other inner tubes. I do away entirely with the handling of groups of blanks with mandrels therein into and out of a steam chamber for vulcanizing. I provide for encasing the unvulcanized blank in elastic material which obviates impressions of cloth wrinkles in the vulcanized product. Vulcanized products produced according to my invention are of greatly superior uniformity.

In the manufacture of an elongated product out of material having a vulcanizable component I form an elongated blank out of such material, encase the blank in a confining and protective tube of elastic material and vulcanize the blank while so encased. I find that superior results are obtained when the protective tube of elastic material closely embraces the blank of its own elasticity while the blank is being vulcanized. When I refer to a blank as "having a vulcanizable component" I mean to include blanks which are substantially homogeneous and also blanks which are non-homogeneous such as blanks made up entirely of rubber and blanks containing separate reinforcing along with a vulcanizable component such as rubber. In the case of an unreinforced blank the rubber may be the only component.

My invention is not confined to the manufacture of elongated products. Broadly I provide for forming a blank out of material having a vulcanizable component, stretching a confining and protective casing of elastic material to permit introduction of the blank thereinto, introducing the blank into the stretched casing, by the elasticity of the casing closely embracing the blank after introduction of the blank into the casing and vulcanizing the blank while encased within the casing. Desirably I provide for stretching the casing by a differential of pressure between the inside and the outside thereof to permit introduction of the blank thereinto and eliminating the pressure differential to cause the casing by its own elasticity to closely embrace the blank.

I provide apparatus for vulcanizing a blank made of material having a vulcanizable component comprising an outer casing having an opening for receiving the blank, an inner casing of elastic material within the outer casing and means for creating a pressure differential between the inside and the outside of the inner casing whereby the inner casing may be stretched to permit introduction of the blank thereinto, the inner casing being adapted to closely embrace the blank by its own elasticity upon elimination of the pressure differential so that the blank may be vulcanized while thus closely embraced by the inner casing. I preferably provide vacuum creating means and a connection from the vacuum creating means to the space between the inner casing and the outer casing so that upon the creation of vacuum the inner casing is stretched outwardly to permit introduction of the blank thereinto. Upon elimination of the vacuum the inner casing closely embraces the blank by its own elasticity.

While it would be possible to introduce blanks thus encased into a steam chamber for vulcanization in the same general manner as above described I prefer to provide means for introducing relatively hot fluid into the space between the inner casing and the outer casing to vulcanize the blank while closely embraced by the inner casing. Thus the blank may simply be introduced into the vulcanizing apparatus without any prior wrapping, vulcanized and then withdrawn. Vacuum stretches outwardly the inner casing of elastic material so as in effect to increase the transverse dimension or diameter thereof when the blank is introduced and withdrawn; when the vacuum is eliminated after introduction of the blank the casing of elastic material closely embraces the blank by its own elasticity. While the blank is so embraced relatively hot fluid, normally steam under perhaps fifty pounds pressure, is introduced into the space between the inner casing and the outer casing to vulcanize the blank.

With reference to the vulcanizing of an elongated blank such as a blank for a length of air brake hose I preferably provide an outer generally tubular casing open at an end thereof for receiving the blank, an inner generally tubular casing of elastic material within the outer casing and generally coaxial therewith, the inner and outer casings being connected together adjacent their ends, and means for creating a pressure differential between the inside and the outside of the inner casing whereby the inner casing may be stretched to permit introduction of the blank thereinto, the inner casing being adapted to closely embrace the blank by its own elasticity upon elimination of the presssure differential so that the blank may be vulcanized while thus closely embraced by the inner casing. The vulcanization is preferably effected by admitting steam or other relatively hot fluid into the space between the inner casing and the outer casing, the temperature and time required for vulcanizing any particular product depending upon the character of the product and being well known to those skilled in the art. Desirably there are both a vacuum connection and a steam connection to the space between the inner and outer casings.

Preferably the inner casing when in its normal state has its outside diameter substantially smaller than the inside diameter of the outer casing, the inner casing being radially stretched adjacent its ends and sealed to the outer casing, and the inner casing is adapted to be radially stretched intermediate its ends to permit introduction of the blank thereinto by creating a vacuum in the space between the inner and outer casings.

I further provide apparatus for vulcanizing an elongated blank made of material having a vulcanizable component comprising a tubular casing of elastic material into which the blank is adapted to be inserted and which is adapted to closely embrace the blank after introduction of the blank into the casing and retaining devices adapted to lie within the casing at the ends of the blank and to be closely embraced by the casing. Means are preferably provided for increasing and decreasing the transverse dimension of the casing so that when such dimension is increased the blank may be inserted into and removed from the casing and when such dimension is decreased the casing will closely embrace the blank. As indicated above, the casing preferably closely embraces the blank by its own elasticity and may be stretched to permit insertion and removal of the blank.

When a hollow blank is to be vulcanized I preferably provide, as above described, a mandrel adapted to be disposed within the blank, a tubular casing of elastic material into which the blank with the mandrel therein is adapted to be inserted and which is adapted to closely embrace the blank by its own elasticity and means for stretching the casing to permit insertion and removal of the blank. Retaining devices are preferably disposed about the mandrel at the ends of the blank, each of the retaining devices preferably having its inner end portion of approximately the same outside diameter as the outside diameter of the blank and tapering to greater outside diameter at its outer end portion, the outside diameter of the outer end portions of the retaining devices desirably approximating the inside diameter of the inner casing adjacent the ends thereof where it is connected to the outer casing. The inner casing is desirably radially stretched adjacent its ends and sealed to the outer casing. For example, each end of the inner casing may be radially stretched to lie against the inside of the outer casing and a ring may be provided within each such radially stretched end of the inner casing pressing and maintaining such end of the inner casing in sealed relationship to the outer casing.

Other details, objects and advantages of the invention will become apparent as the following description of a present preferred embodiment thereof and a present preferred method of practicing the same proceeds.

In the accompanying drawing I have shown a present preferred embodiment of the invention and have illustrated a present preferred method of practicing the same, the drawing being a central longitudinal cross-sectional view through apparatus for vulcanizing an elongated hollow blank, such, for example, as a blank of reinforced rubber for the manufacture of a length of air brake hose.

Referring now more particularly to the drawing, there is shown at 2 a mandrel which is in the form of a length of pipe having at each end a pair of opposed bayonet slots 3 for a purpose to be presently described. Disposed about the central portion of the mandrel 2 is a blank 4 for a length of air brake hose. The blank 4 may comprise an inner rubber tube which may be formed in any convenient manner, as, for example, by extrusion, with reinforcing and an outer sheet rubber cover wrapped thereabout as well known to those skilled in the art. I claim nothing new in the manufacture of the blank 4, which may be conventionally made.

Cured rubber backing washers 5 are applied over the ends of the mandrel 2 and against the ends of the blank 4 after trimming of the ends of the blank in known manner, the application of such washers also being conventional. Retainers 6, which may be of any suitable material, such as metal, are applied over the ends of the mandrel 2 tightly against the washers 5 pressing the washers against the ends of the blank 4. Each of the retainers 6 is in the form of a hollow truncated cone and is maintained in place on the mandrel 2 by a pin 7 extending through the retainer and received in the opposed bayonet slots 3 in the corresponding end of the mandrel. Retainers applied in similar manner are old in the art, but my retainers differ from those which have previously been used in that the previously used retainers have been of hollow cylindrical form whereas mine are in the form of hollow truncated cones. I can use cylindrical retainers but I obtain advantages by the use of conical retainers as will be explained. Each of my retainers 6 has its inner end portion (i. e., the end portion thereof nearer the longitudinal center of the mandrel) of approximately the same outside diameter as the blank. Each of the retainers has a generally conical or tapered outside surface, the outer end portion of the retainer having an outside diameter approximating the inside diameter of the inner casing adjacent the ends thereof where it is connected to the outer casing, the inner and outer casing to be presently described.

The assembly of the mandrel 2, the blank 4, the washers 5 and the retainers 6 is the same as assemblies formed for the same purpose prior to my invention except for the shape of the retainers. Prior to my invention such an assembly but with cylindrical rather than frusto-conical retainers was prepared and then wrapped in cloth, introduced into a steam chamber for vulcanizing, removed from the steam chamber after vulcanizing and unwrapped. I do not wrap the blank and I eliminate the manipulation of a wrapped blank into and out of a steam chamber.

I provide vulcanizing apparatus comprising an outer cylindrical casing 8 which may be made from a length of pipe having a connection 9 extending to a source of steam under about fifty pounds pressure and a connection 10 extending to a vacuum pump. Disposed within the outer casing 8 is an inner casing 11 of elastic material, such, for example, as rubber. For present purposes the inner casing 11 will be considered as being a rubber tube. The tube 11 when in its normal state has an outside diameter substantially smaller than the inside diameter of the casing 8. Each end of the tube 11 is radially stretched to lie against the inside of the casing 8 at 12 and a brass ring 13 is expanded into each end of the tube 11 to press and maintain such end of the tube in sealed relationship to the casing 8.

When the assembly consisting of the mandrel 2, blank 4, washers 5 and retainers 6 has been prepared air is partially exhausted from the generally annular space between the inside of the casing 8 and the outside of the tube 11 between the rings 13. Thus a partial vacuum is created which stretches the tube 11 so as in effect to increase its diameter. When so stretched it lies substantially against the inner wall of the casing 8. With the tube 11 thus stretched or expanded the assembly consisting of the mandrel 2, the blank 4, the washers 5 and the retainers 6 is introduced through one end of the casing 8 into the tube 11. The overall length of the assembly is slightly less than the axial distance between the rings 13 as shown in the drawing. The outer ends of the retainers have a fairly snug fit against the tube 11 just inwardly of the rings 13. When the assembly has been thus positioned the vacuum is relieved, the connection 10 to the vacuum pump is closed by any suitable valve, not shown, and steam is admitted through the connection 9, the steam being at such temperature and pressure and being maintained in the annular space between the casing 8 and the tube 11 for such a period as to effect vulcanization of the blank 4. Steam may be circulated through the vulcanizing apparatus if desired, either the connection 10 or another connection being utilized to exhaust the steam. After the blank 4 has been vulcanized the steam is shut off, the steam connection closed and the vacuum pump operated to again stretch the tube 11 permitting withdrawal of the assembly. The retainers and washers are removed from the mandrel and the vulcanized blank, now a length of air hose, is stripped from the mandrel.

The retainers 6 are preferably tapered as shown to obviate an abrupt "step" in the ends of the tube 11 during vulcanizing of the blank. With the tapered retainers the tube 11 has a much longer life than it would have if cylindrical retainers were used.

By my method and apparatus I am able to produce lengths of air brake hose or other products of superior quality and unprecedented uniformity at substantially reduced cost, eliminating entirely the wrapping of the unvulcanized blank, the handling of a wrapped blank into and out of a steam chamber and the unwrapping of the vulcanized blank or finished length of hose.

While I have shown and described a present preferred embodiment of the invention and have illustrated a present preferred method of practicing the same it is to be distinctly understood that the invention is not limited thereto but may be otherwise variously embodied and practiced within the scope of the following claims.

I claim:

1. Apparatus for vulcanizing an elongated hollow blank made of material having a vulcanizable component comprising a mandrel adapted to be disposed within the blank, retaining devices disposed about the mandrel at the ends of the blank, each of the retaining devices having its inner end portion of approximately the same outside diameter as the blank and tapering to greater outside diameter at its outer end portion, an outer generally tubular casing open at an end thereof for receiving the mandrel with the blank and retaining devices thereon, an inner generally tubular casing of elastic material within the outer casing and generally coaxial therewith, the inner and outer casings being connected together adjacent their ends, and means for creating a pressure differential between the inside and the outside of the inner casing whereby the inner casing may be stretched to permit introduction thereinto of the mandrel with the blank and retaining devices thereon, the inner casing being adapted to closely embrace the blank and retaining devices by its own elasticity upon elimination of the pressure differential, the outside diameter of the outer end portions of the retaining devices approximating the inside diameter of the inner casing adjacent the ends thereof where it is connected to the outer casing.

2. Apparatus for vulcanizing an elongated hollow blank made of material having a vulcanizable component comprising a mandrel adapted to be disposed within the blank, retaining devices disposed about the mandrel at the ends of the blank, each of the retaining devices having its inner end portion of approximately the same outside diameter as the blank and tapering to greater outside diameter at its outer end portion, an outer generally tubular casing open at an end thereof for receiving the mandrel with the blank and retaining devices thereon, an inner generally tubular casing of elastic material within the outer casing and generally coaxial therewith, the inner casing when in its normal state having its outside diameter substantially smaller than the inside diameter of the outer casing, the inner casing being radially stretched adjacent its ends and sealed to the outer casing, and means for creating a pressure differential between the inside and the outside of the inner casing whereby the inner casing may be stretched to permit introduction thereinto of the mandrel with the blank and retaining devices thereon, the inner casing being adapted to closely embrace the blank and retaining devices by its own elasticity upon elimination of the pressure differential, the outside diameter of the outer end portions of the retaining devices approximating the inside diameter of the inner casing adjacent the ends thereof where it is radially stretched and sealed to the outer casing.

3. Apparatus for vulcanizing an elongated hollow blank made of material having a vulcanizable component comprising a mandrel adapted to be disposed within the blank, retaining devices disposed about the mandrel at the ends of the blank, each of the retaining devices having its inner end portion of approximately the same outside diameter as the blank and tapering to greater outside diameter at its outer end portion, an outer generally tubular casing open at an end thereof for receiving the mandrel with the blank and retaining devices thereon, an inner generally tubular casing of elastic material within the outer casing and generally coaxial therewith, the inner casing when in its normal state having its outside diameter substantially smaller than the inside diameter of the outer casing, each end of the inner casing being radially stretched to lie against the inside of the outer casing, a ring within each such radially stretched end of the inner casing pressing and maintaining such end of the inner casing in sealed relationship to the outer casing, and means for creating a pressure differential between the inside and the outside of the inner casing whereby the inner casing may be stretched to permit introduction thereinto of the mandrel with the blank and retaining devices thereon, the inner casing being adapted to closely embrace the blank and retaining devices by its own elasticity upon elimination of the pressure differential, the outside diameter of the outer end portions of the retaining devices approximating the inside diameter of the inner casing adjacent the ends thereof where it is radially stretched and sealed to the outer casing.

References Cited in the file of this patent

UNITED STATES PATENTS

| Number | Name | Date |
|---|---|---|
| 232,037 | Hyatt | Sept. 7, 1880 |
| 604,258 | Menier | May 17, 1898 |
| 1,182,598 | Strauss | May 9, 1916 |
| 1,209,308 | Lanhoffer | Dec. 19, 1916 |
| 2,142,445 | Helwig | Jan. 3, 1939 |
| 2,253,792 | Leavenworth | Aug. 26, 1941 |
| 2,392,315 | Davis | Jan. 8, 1946 |
| 2,401,299 | Glavin | June 4, 1946 |
| 2,446,281 | Harding | Apr. 3, 1948 |
| 2,573,642 | Hurry | Oct. 30, 1951 |
| 2,584,501 | Roberts | Feb. 5, 1952 |